(12) United States Patent
Doh et al.

(10) Patent No.: US 11,181,271 B2
(45) Date of Patent: Nov. 23, 2021

(54) FUEL NOZZLE, AND COMBUSTOR AND GAS TURBINE HAVING THE SAME

(71) Applicant: DOOSAN HEAVY INDUSTRIES & CONSTRUCTION CO., LTD., Changwon-si (KR)

(72) Inventors: Yunyoung Doh, Changwon-si (KR); Donggon Lee, Seoul (KR)

(*) Notice: Subject to any disclaimer, the term of this patent is extended or adjusted under 35 U.S.C. 154(b) by 101 days.

(21) Appl. No.: 16/543,268

(22) Filed: Aug. 16, 2019

(65) Prior Publication Data

US 2020/0124286 A1 Apr. 23, 2020

(30) Foreign Application Priority Data

Sep. 17, 2018 (KR) .......................... 10-2018-0111082

(51) Int. Cl.
| | |
|---|---|
| *F23R 3/14* | (2006.01) |
| *F23R 3/28* | (2006.01) |
| *F02C 7/22* | (2006.01) |
| *F23R 3/34* | (2006.01) |
| *F23R 3/36* | (2006.01) |

(52) U.S. Cl.
CPC ................ *F23R 3/286* (2013.01); *F23R 3/14* (2013.01); *F02C 7/22* (2013.01); *F05D 2220/323* (2013.01); *F05D 2240/35* (2013.01); *F23C 2900/07001* (2013.01); *F23D 2900/14004* (2013.01); *F23R 3/343* (2013.01); *F23R 3/36* (2013.01)

(58) Field of Classification Search
CPC .. F23R 3/14; F23R 3/286; F23R 3/283; F23D 11/383; F23C 2900/07001
See application file for complete search history.

(56) References Cited

U.S. PATENT DOCUMENTS

| | | | |
|---|---|---|---|
| 8,661,779 B2 | 3/2014 | Laster et al. | |
| 9,127,844 B2 | 9/2015 | Slobodyanskiy et al. | |
| 2003/0089801 A1* | 5/2003 | Saitoh | F23R 3/286 |
| | | | 239/533.1 |
| 2009/0173074 A1* | 7/2009 | Johnson | F23R 3/28 |
| | | | 60/737 |

(Continued)

FOREIGN PATENT DOCUMENTS

| | | |
|---|---|---|
| EP | 1933007 A2 | 6/2008 |
| JP | 2013520635 A | 6/2013 |
| KR | 10-2006-0096319 A | 9/2006 |

*Primary Examiner* — Thomas P Burke
(74) *Attorney, Agent, or Firm* — Harvest IP Law, LLP (57) ABSTRACT

A fuel nozzle includes a main cylinder extending in one direction; an auxiliary cylinder surrounding the main cylinder and defining a fuel passage between the auxiliary cylinder and the main cylinder; a shroud spaced that is apart from the auxiliary cylinder and surrounds the auxiliary cylinder; a swirler vane that is disposed between the auxiliary cylinder and the shroud and defines a fuel cavity communicating with the fuel passage so that fuel flowing in the fuel passage flows into the fuel cavity; and a fuel flow guide disposed inside the fuel cavity to guide fuel that flows from the fuel passage and enters the fuel cavity and to distribute the guided fuel in the fuel cavity. A fuel aperture is formed in the swirler vane to communicate with the fuel passage and the fuel cavity so that the fuel flows into the fuel cavity via the fuel aperture.

20 Claims, 6 Drawing Sheets

(56) References Cited

U.S. PATENT DOCUMENTS

| | | | |
|---|---|---|---|
| 2010/0077760 A1* | 4/2010 | Laster | F23C 7/004 |
| | | | 60/742 |
| 2017/0254541 A1* | 9/2017 | Bottcher | F23R 3/286 |
| 2017/0307219 A1* | 10/2017 | Tsunoda | F02C 3/04 |
| 2017/0363291 A1 | 12/2017 | Laster et al. | |
| 2018/0023812 A1 | 1/2018 | Laster et al. | |

* cited by examiner

FUEL NOZZLE, AND COMBUSTOR AND GAS TURBINE HAVING THE SAME

CROSS-REFERENCE TO RELATED APPLICATION

This application claims priority to Korean Patent Application No. 10-2018-0111082, filed on Sep. 17, 2018, the disclosure of which is incorporated by reference herein in its entirety.

BACKGROUND

Field

Apparatuses and methods consistent with exemplary embodiments relate to a fuel nozzle and to a combustor and gas turbine having the same.

Related Art

A gas turbine is a power engine that mixes air compressed in a compressor with fuel for combustion and rotates a turbine using high-temperature gas produced by the combustion. The gas turbine is used to drive a generator, an aircraft, a ship, a train, etc.

This gas turbine typically includes a compressor, a combustor, and a turbine. The compressor draws and compresses outside air, and then transmits it to the combustor. The air compressed in the compressor is in a high-pressure and high-temperature state. The combustor mixes the compressed air introduced from the compressor with fuel and burns the mixture. The combustion gas produced by the combustion is discharged to the turbine. Turbine blades in the turbine are rotated by the combustion gas, thereby generating power. The generated power is used in various fields, such as generating electric power and actuating machines.

SUMMARY

Aspects of one or more exemplary embodiments provide a fuel nozzle for distributing and guiding fuel that flows from a fuel passage to a fuel cavity of a swirler vane, and a combustor and gas turbine having the fuel nozzle.

Additional aspects will be set forth in part in the description which follows and, in part, will become apparent from the description, or may be learned by practice of the exemplary embodiments.

According to an aspect of an exemplary embodiment of the present disclosure, there is provided a fuel nozzle including a main cylinder extending in one direction; an auxiliary cylinder surrounding the main cylinder and defining a fuel passage between the auxiliary cylinder and the main cylinder; a shroud spaced that is apart from the auxiliary cylinder and surrounds the auxiliary cylinder; a swirler vane that is disposed between the auxiliary cylinder and the shroud and defines a fuel cavity communicating with the fuel passage so that fuel flowing in the fuel passage flows into the fuel cavity; and a fuel flow guide disposed inside the fuel cavity and configured to guide fuel that flows from the fuel passage and enters the fuel cavity and to distribute the guided fuel in the fuel cavity.

The fuel nozzle may further include a fuel aperture formed in the swirler vane and configured to communicate with the fuel passage and the fuel cavity so that the fuel flowing in the fuel passage flows into the fuel cavity via the fuel aperture. The fuel flow guide may include a fuel receiving end that extends toward the fuel passage and terminates at the fuel aperture. The fuel receiving end of the fuel flow guide may be disposed downstream of the fuel aperture and may be arranged along a line perpendicular to a flow direction of fuel through the fuel aperture. The fuel receiving end of the fuel flow guide may include a plurality of plates, and at least one of the plurality of plates may include a curved end disposed toward the fuel passage.

The flow guide may include a plurality of guide members each having a plate shape for receiving fuel entering the fuel cavity via the fuel aperture, for guiding the received fuel, and for distributing the fuel introduced into the fuel cavity.

The fuel nozzle may further include a guide support having a first end fixed to an inner surface of the fuel cavity and having a second end supporting the plurality of guide members inside the fuel cavity.

Each of the plurality of guide members may be inclined at a same angle with respect to a line perpendicular to a flow direction of fuel through the fuel aperture, or may be inclined at a different angle with respect to the line perpendicular to the flow direction of fuel through the fuel aperture. For the plurality of guide members inclined at different angles, the plurality of guide members may be configured such that a first angle of inclination of a first guide member of the plurality of guide members for guiding fuel to a proximal fuel vent formed in the swirler vane is smaller than a second angle of inclination of a second guide member of the plurality of guide members for guiding fuel to a distal fuel vent formed in the swirler vane.

The fuel nozzle may further include a plurality of fuel vents that respectively communicate with the fuel cavity and are arranged along a line extending away from the fuel aperture, wherein the plurality of guide members include a number of guide members corresponding to the arrangement of the fuel vents.

The plurality of guide members may be disposed at different heights with respect to a line perpendicular to a flow direction of fuel through the fuel aperture and are configured such that a height of a second guide member for guiding fuel to a distal fuel vent of the plurality of fuel vents is larger than a height of a first guide member for guiding fuel to a proximal fuel vent of the plurality of fuel vents.

The plurality of guide members may divide the fuel aperture into a plurality of subdivisions, and the plurality of subdivisions may correspond to the plurality of fuel vents. Here, the plurality of guide members may be configured such that a second area of the divided fuel aperture formed by a second guide member for guiding fuel to a distal fuel vent of the plurality of fuel vents is different from, or larger than, a first area of the divided fuel aperture formed by a first guide member for guiding fuel to a proximal fuel vent of the plurality of fuel vents.

The fuel flow guide may include an auxiliary guide member protruding from a first inner wall of the fuel passage toward a second inner wall of the fuel passage opposite the first inner wall. Here, the second inner wall may communicate with the fuel aperture of the swirler vane. Also, the auxiliary guide member may be disposed so as to face the fuel aperture and include a fillet shaped side surface to direct the fuel flowing in the fuel passage into the fuel aperture, or may be disposed upstream of the fuel aperture and include a fillet shaped side surface to direct the fuel flowing in the fuel passage toward the second inner wall before entering the fuel aperture.

According to another aspect of the present disclosure, there is provided a combustor including a combustion chamber assembly comprising a combustion chamber in which fuel is burned; and a fuel nozzle assembly comprising a plurality of fuel nozzles to inject fuel into the combustion chamber. In the combustor, each of the fuel nozzles is consistent with the above-described fuel nozzle.

According to another aspect of the present disclosure, there is provided a gas turbine including a compressor to compress air; a combustor to produce combustion gas by mixing the compressed air with fuel for combustion; and a turbine to generate power by the combustion gas. In the gas turbine, the combustor is consistent with the above-described combustor.

It is to be understood that both the foregoing general description and the following detailed description of exemplary embodiments are exemplary and explanatory and are intended to provide further explanation of the disclosure as claimed.

BRIEF DESCRIPTION OF THE DRAWINGS

The above and other aspects will become more apparent from the following description of the exemplary embodiments with reference to the accompanying drawings, in which.

DETAILED DESCRIPTION

Hereinafter, a fuel nozzle, and a combustor and gas turbine having the same according to exemplary embodiments will be described in detail with reference to the accompanying drawings so that those skilled in the art can carry out the invention. It should be understood, however, that the exemplary embodiments are not for limiting the scope of the disclosure to the specific embodiment and should be interpreted to include all modifications, equivalents, and alternatives of the embodiments included within the spirit and scope disclosed. In order to clearly illustrate the disclosure in the drawings, some of the elements that are not essential to a complete understanding of the disclosure may be omitted, and like reference numerals refer to like elements throughout the specification.

It will be understood that when a component is referred to as "comprising" or "including" any component, it does not exclude other components and may further comprise or include other components unless otherwise specified. In addition, it will be understood that a spatially relative term "on" used herein does not necessarily mean that an element is located on another element in the direction of gravity and may mean that the element is located on or under the other element.

Figure 1:
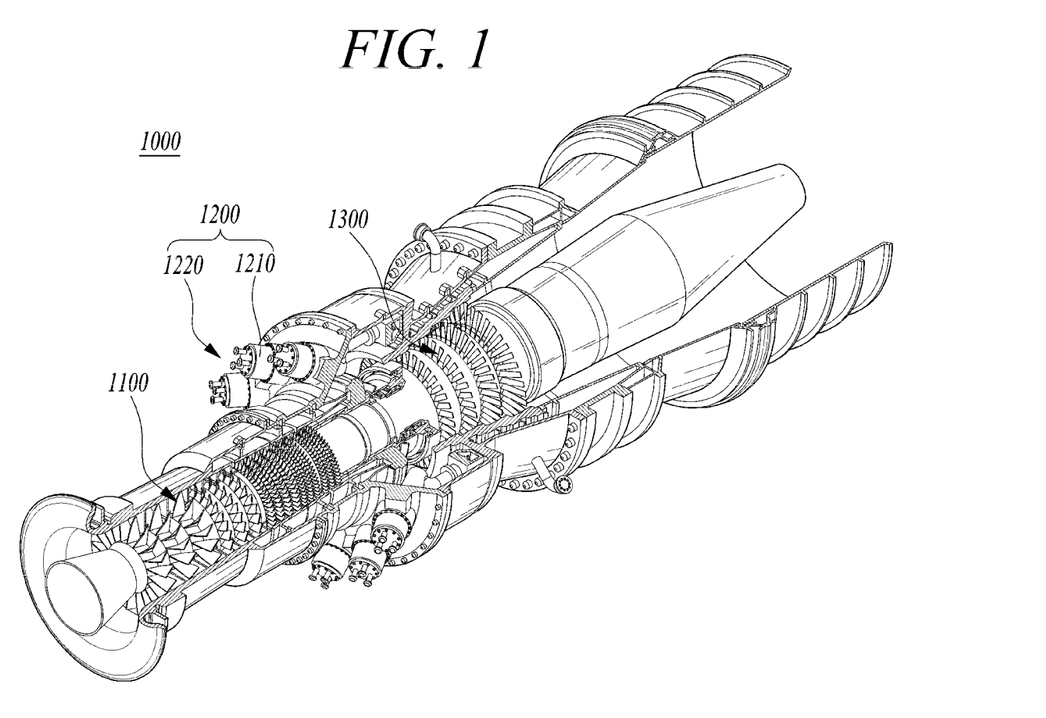
FIG. 1 is a cutaway perspective view of a gas turbine in which may be applied a combustor according to the present disclosure.
Figure 2:
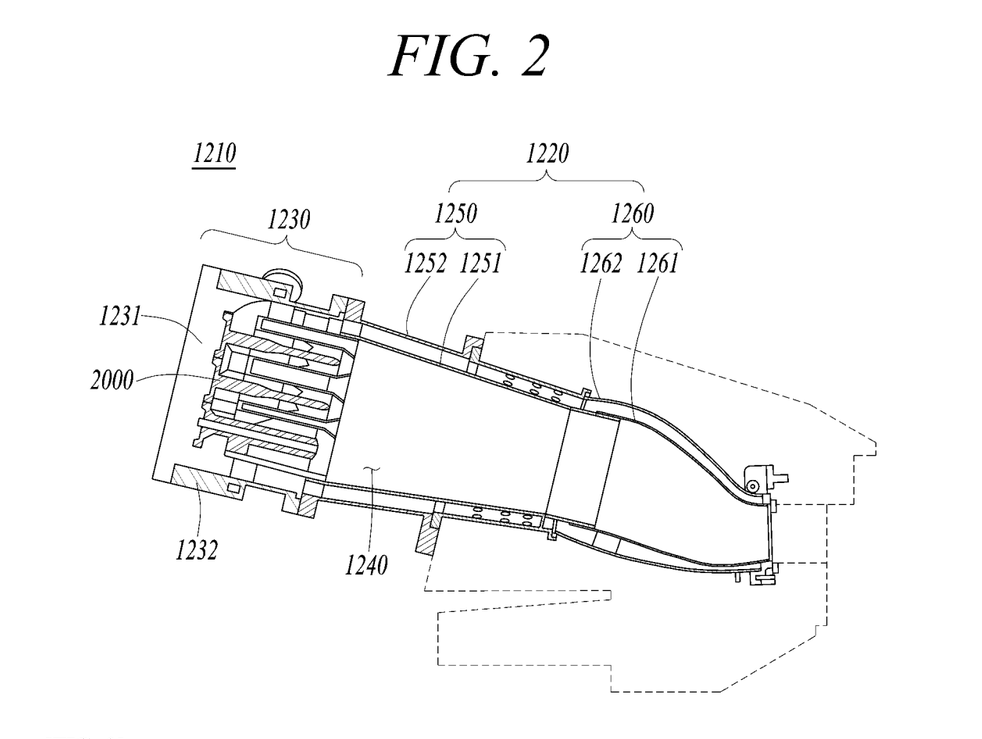
FIG. 2 is a sectional view of a combustor of FIG. 1 in which may be applied a fuel nozzle according to the present disclosure.

FIGS. 1 and 2 respectively illustrate exemplary embodiments of a gas turbine and a combustor according to the present disclosure.

Referring to FIG. 1, a gas turbine 1000 includes a compressor 1100 that compresses introduced air to a high pressure, a combustor 1200 that mixes the compressed air supplied from the compressor 1100 with fuel and burns the mixture, and a turbine 1300 that generates a rotational force by combustion gas produced in the combustor 1200. In the specification, upstream and downstream sides are defined based on the flow direction of fuel or air.

The thermodynamic cycle of the gas turbine may ideally follow a Brayton cycle. The Brayton cycle consists of four phases including isentropic compression (adiabatic compression), isobaric heat addition, isentropic expansion (adiabatic expansion), and isobaric heat dissipation. In the Brayton cycle, thermal energy is released by combustion of fuel in an isobaric environment after the atmospheric air is drawn and compressed to a high pressure, hot combustion gas is expanded to be converted into kinetic energy, and exhaust gas with residual energy is then discharged to the atmosphere. In other words, the Brayton cycle consists of four processes, i.e., compression, heating, expansion, and exhaust. The disclosure may be widely applied to a gas turbine having the same configuration as the gas turbine 1000 exemplarily illustrated in FIG. 1.

The compressor 1100 of the gas turbine serves to draw and compress air, and serves to supply cooling air required for cooling a high-temperature region in the gas turbine while supplying combustion air to the combustor 1200. Since the air drawn into the compressor 1100 is subject to an adiabatic compression process, the pressure and temperature of the air passing through the compressor 1100 increase.

The compressor 1100 of the gas turbine may be typically designed as a centrifugal compressor or an axial compressor. In general, the centrifugal compressor is applied to a small gas turbine, whereas a multistage axial compressor is applied to the large gas turbine as illustrated in FIG. 1 because it is necessary to compress a large amount of air.

The compressor 1100 is driven using a portion of the power output from the turbine 1300. To this end, the rotary shaft (not shown) of the compressor 1100 is directly connected to the rotary shaft of the turbine 1300.

The combustor 1200 mixes the compressed air supplied from the outlet of the compressor 1100 with fuel for isobaric combustion to produce high-energy combustion gas. The combustor 1200 is disposed downstream of the compressor 1100 and includes a plurality of burner modules 1210 annularly arranged around the rotary shaft thereof.

Referring to FIG. 2, each of the burner modules 1210 may include a combustion chamber assembly 1220 including a combustion chamber 1240 in which fuel is burned, and a fuel nozzle assembly 1230 including a plurality of fuel nozzles 2000 for injecting fuel into the combustion chamber 1240. The fuel supplied from the fuel nozzles 2000 is mixed with air at an appropriate rate to be suitable for combustion.

The gas turbine may use gas fuel, liquid fuel, or a composite of the two, and references to fuel in the exemplary embodiment indicates any one of the above. It is important to make a combustion environment for reducing an amount of emission such as carbon monoxide or nitrogen oxide that is subject to legal regulations. Accordingly, premixed combustion has been increasingly used in recent years in that it can accomplish uniform combustion to reduce emission by lowering a combustion temperature even though it is relatively difficult to control combustion.

In the pre-mixed combustion, the compressed air supplied from the compressor 1100 is mixed with fuel in the fuel nozzle assembly 1230 and then introduced into the combustion chamber 1240. When combustion is stable after premixed gas is initially ignited by an igniter, the combustion is maintained by the supply of fuel and air.

The fuel nozzles 2000 of the fuel nozzle assembly 1230 may be configured such that a plurality of outer fuel nozzles are radially arranged around one inner fuel nozzle. The fuel nozzles 2000 will be described below in detail.

The combustion chamber assembly 1220 includes the combustion chamber 1240 as a space in which combustion is performed, and further includes a liner 1250 and a transition piece 1260.

The liner 1250, which is disposed downstream of the fuel nozzle assembly 1230, may have a double structure formed by an inner liner 1251 and an outer liner 1252 surrounding the inner liner 1251. The inner liner 1251 is a hollow tubular member forming the combustion chamber 1240 and may be cooled by compressed air entering an annular space inside the outer liner 1252.

The transition piece 1260 is disposed downstream of the liner 1250. The combustion gas produced in the combustion chamber 1240 may be discharged from the transition piece 1260 to the turbine 1300. The transition piece 1260 may have a double structure formed by an inner transition piece 1261 and an outer transition piece 1262 surrounding the inner transition piece 1261. The inner transition piece 1261 is a hollow tubular member similar to the inner liner 1251, and its diameter may be gradually reduced from the liner 1250 to the turbine 1300. In this case, the inner liner 1251 may be coupled to the inner transition piece 1261 by a plate spring seal (not shown). Since ends of the inner liner 1251 and the inner transition piece 1261 are fixed to the combustor 1200 and the turbine 1300, respectively, the plate spring seal must have a structure that is capable of accommodating length and diameter elongation by thermal expansion in order to support the inner liner 1251 and the inner transition piece 1261.

The gas turbine has a structure in which the outer liner 1252 and the outer transition piece 1262 respectively surround the inner liner 1251 and the inner transition piece 1261. Compressed air may enter the annular space between the inner liner 1251 and the outer liner 1252 and the annular space between the inner transition piece 1261 and the outer transition piece 1262. The inner liner 1251 and the inner transition piece 1261 may be cooled by the compressed air flowing in these annular spaces.

The high-temperature and high-pressure combustion gas produced in the combustor 1200 is supplied to the turbine 1300 through the liner 1250 and the transition piece 1260. In the turbine 1300, the thermal energy of combustion gas is converted into mechanical energy to rotate a rotary shaft by applying impingement and reaction force to a plurality of blades radially arranged on the rotary shaft of the turbine 1300 through the adiabatic expansion of the combustion gas. Some of the mechanical energy obtained from the turbine 1300 is supplied as energy required for compression of air in the compressor, and the remainder is used as effective energy required for driving a generator to produce electric power or the like.

Hereinafter, the fuel nozzles according to the exemplary embodiment will be described with reference to the accompanying drawings.

Figure 3:
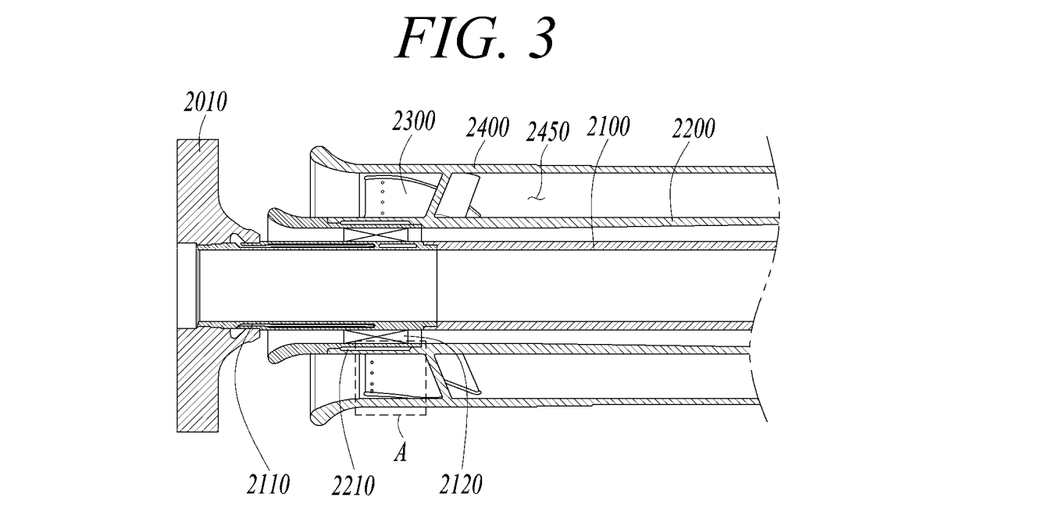
FIG. 3 is a sectional view of a fuel nozzle of FIG. 2 according to an exemplary embodiment of the present disclosure.

As illustrated in FIG. 3, each of the fuel nozzles 2000 according to the exemplary embodiment includes a main cylinder 2100, an auxiliary cylinder 2200, at least one swirler vane 2300, and a shroud 2400. The shroud 2400 surrounds the auxiliary cylinder 2200 and thus defines a space 2450 through which fuel and air may pass.

A head end plate 1231 (FIG. 2) is coupled to the end of a nozzle casing 1232 forming the outer wall of the fuel nozzle assembly 1230 to seal the nozzle casing 1232, and supports the fuel nozzle 2000 disposed in the nozzle casing 1232. A nozzle flange 2010 is disposed at one end of the main cylinder 2100 in order to fix the main cylinder 2100 to the head end plate 1231.

The main cylinder 2100 extends generally in the direction of the combustion chamber 1240. The main cylinder 2100 may define a space for mixing fuel and air or may form other components constituting the fuel nozzle. The main cylinder 2100 may be coupled with a manifold, a related valve, or the like for supply of fuel. The main cylinder 2100 may have a cylindrical shape including an inner wall and an outer wall. A first passage 2110 is defined between the inner and outer walls of the main cylinder 2100 so that the fuel supplied from the manifold for supply of fuel flows in the first passage 2110.

The auxiliary cylinder 2200 is spaced around the main cylinder 2100 so as to surround the main cylinder 2100 and to define a fuel passage between the auxiliary cylinder and the main cylinder so that fuel may flow in the fuel passage. Thus, the main cylinder 2100 is concentrically disposed inside the auxiliary cylinder 2200, which also may have a cylindrical shape including an inner wall and an outer wall. A second passage 2210 is formed between the inner and outer walls of the auxiliary cylinder 2200 so that the fuel supplied from the first passage 2110 flows in the auxiliary cylinder 2200. An auxiliary swirler 2120 is connected radially between the main cylinder 2100 and the auxiliary cylinder 2200. The auxiliary swirler 2120 allows the fuel flowing in the first passage 2110 defined in the main cylinder 2100 to flow in the second passage 2210 defined in the auxiliary cylinder 2200. Then, some of the flowing fuel is discharged into the space 2450 (described later) between the auxiliary cylinder 2200 and the shroud 2400 to be mixed with the compressed air.

Some of the compressed air introduced into the annular space between the inner liner 1251 and the outer liner 1252 flows into the space between the auxiliary cylinder 2200 and the shroud 2400 to be mixed with the fuel supplied through the swirler vanes 2300, and the remainder flows into the space between the main cylinder 2100 and the auxiliary cylinder 2200 to be mixed with the fuel supplied through the auxiliary swirler 2120.

The shroud 2400 is spaced apart from the auxiliary cylinder 2200 to longitudinally surround the auxiliary cylinder 2200, thereby defining the space 2450 through which fuel and air may pass. The shroud 2400 extends in the longitudinal direction of the main cylinder 2100 and the auxiliary cylinder 2200. Preferably, the shroud 2400 may be spaced apart from the auxiliary cylinder 2200 by a certain distance while having the same axis as the main cylinder 2100 and the auxiliary cylinder 2200 so as to surround the auxiliary cylinder 2200. In the exemplary embodiment, the shroud 2400 is illustrated as having a cylindrical shape. In this case, the space 2450 defined by the auxiliary cylinder 2200 and the shroud 2400 may have an annular cross-section.

The swirler vanes 2300 are radially arranged along an intermediate section of the outer peripheral surface of the auxiliary cylinder 2200, thereby generating a swirl flow of fuel introduced into the space between the shroud 2400 and the auxiliary cylinder 2200. Each of the swirler vanes 2300 defines a fuel cavity 2310 communicating with the second passage 2210 of the auxiliary cylinder 2200. The fuel flowing in the second passage 2210 may be discharged to the outside of the swirler vane 2300, via the fuel cavity 2310, through a plurality of fuel vents 2330 formed as holes penetrating the swirler vane 2300 and spaced apart from each other.

Figure 4:
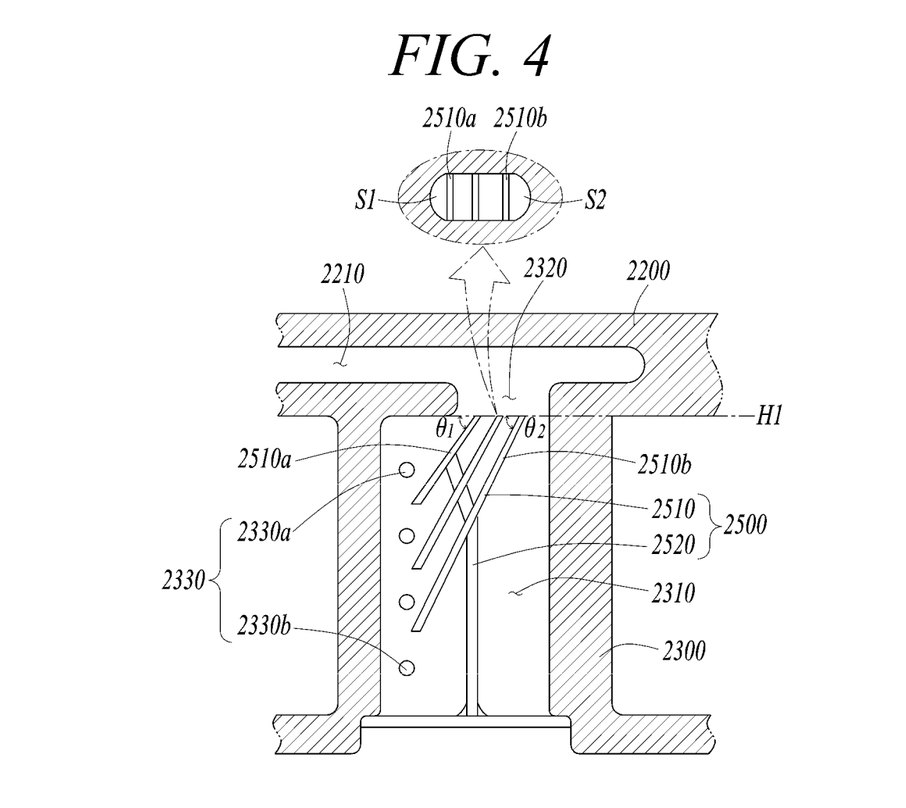
FIG. 4 is an enlarged view of portion "A" of FIG. 3 and illustrates a fuel flow guide of the fuel nozzle.

As illustrated in FIG. 4, the fuel flowing in the second passage 2210 is introduced into the fuel cavity 2310 through a fuel aperture 2320 formed as an opening in an upper wall of the swirler vane 2300 for forming an upper side (upstream side) of the fuel cavity 2310. Disposed downstream of the fuel aperture 2320 is a fuel flow guide 2500 for receiving fuel entering the fuel cavity 2310 via the fuel aperture 2320, guiding the received fuel, and distributing the fuel that has been thus introduced into the fuel cavity 2310. The fuel flow guide 2500 includes a plurality of guide members 2510 formed at a predetermined angle while having a plate shape. The fuel flow guide 2500 may include a guide support 2520 that supports the guide members 2510 in the fuel cavity 2310.

The fuel vents 2330 are arranged along an imaginary line extending away from the fuel aperture 2320 and include a proximal fuel vent 2330a disposed near the fuel aperture 2320 and a distal fuel vent 2330b disposed far from the fuel aperture 2320. The number of guide members 2510 may correspond to the number of fuel vents 2330 and include first and second guide members 2510a and 210b for respectively guiding fuel to the fuel vents 2330a and 2330b. The guide members 2510 may be inclined at the same angle or may be inclined at different angles. When the guide members 2510 are inclined at different angles, a first inclination angle $\theta_1$ of the first guide member 2510a may be smaller than a second inclination angle $\theta_2$ of the second guide member 2510b, wherein the angles of inclination are measured with respect to an imaginary line perpendicular to the flow direction of fuel through the fuel aperture 2320.

As shown in the callout of FIG. 4, the guide members 2510 effectively separate the fuel aperture 2320 into a plurality of aperture subdivisions, such that an area ratio among the aperture subdivisions may be controlled by the disposition of the guide members 2510. Thus, the flow amount of fuel introduced into the fuel cavity 2310 through the fuel aperture 2320 may be controlled depending on the area ratio formed by the plurality of guide members 2510. In this case, since the flow amount of fuel guided to the distal fuel vent 2330b is greater than the flow amount of fuel guided to the proximal fuel vent 2330a, the amount of fuel discharged through the distal fuel vent 2330b may be reduced due to the turbulence generated by a large amount of flow. Therefore, it is preferable to alleviate the turbulence phenomenon by decreasing the flow rate of fuel guided to the distal fuel vent 2330b. To this end, it is preferable to control the area ratio such that a second area S2 formed by the second guide member 2510b for guiding fuel to the distal fuel vent 2330b is larger than a first area S1 formed by the first guide member 2510a for guiding fuel to the proximal fuel vent 2330a. This area ratio control is determined in consideration of the performance, output, shape, and the like required in designing the fuel nozzle.

Figure 5:
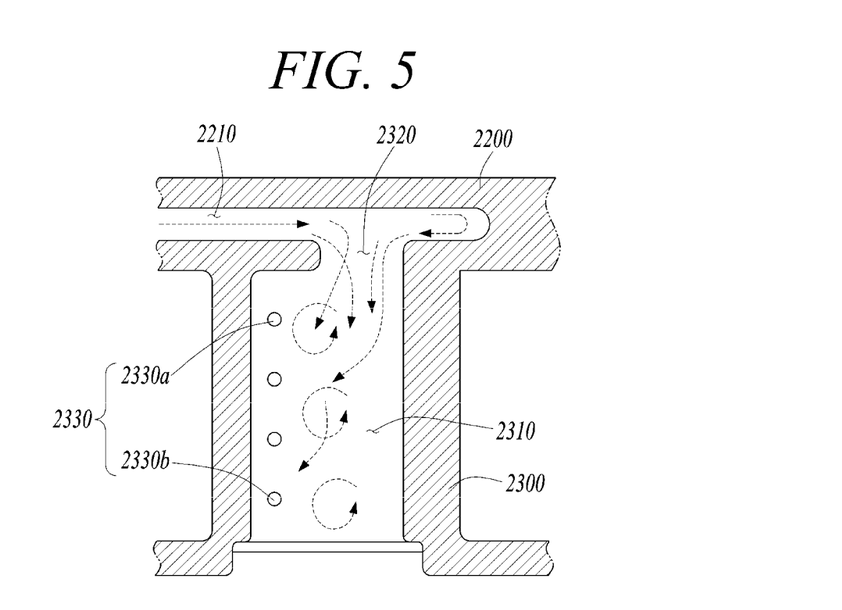
FIG. 5 is a sectional view of a swirler vane without a fuel flow guide, illustrating a state in which fuel is discharged.
Figure 6:
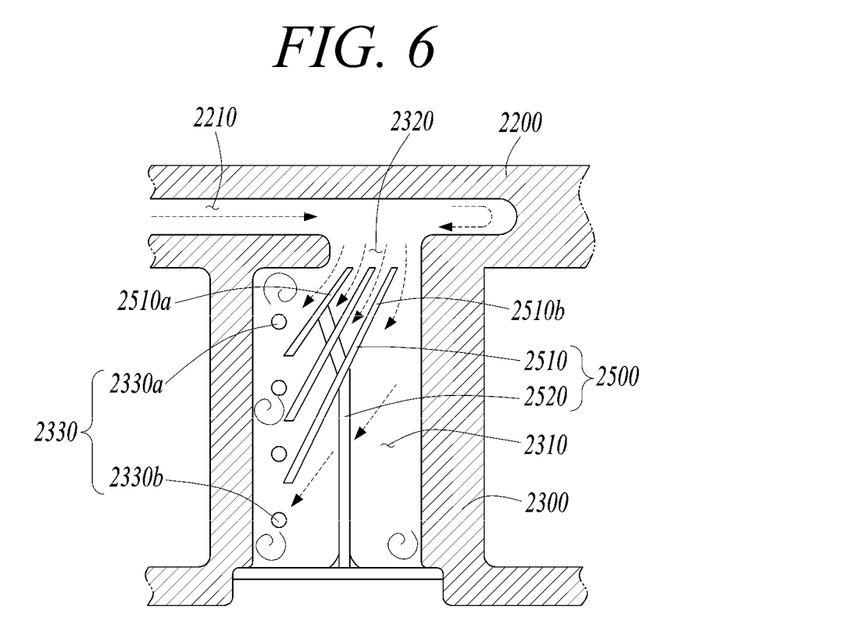
FIG. 6 is a sectional view of a swirler vane with a fuel flow guide according to an exemplary embodiment, for illustrating a state in which fuel is distributed and guided by the fuel flow guide.

FIG. 5 illustrates a state in which fuel is discharged from a swirler vane formed without the guide members 2520, while FIG. 6 illustrates a state in which fuel is distributed and guided by a fuel flow guide according to an exemplary embodiment.

As illustrated in FIG. 5, the fuel introduced into a fuel cavity may be concentrated toward the proximal fuel vent 2330a. Hence, turbulence is generated around the proximal fuel vent 2330a as a large amount of fuel is concentrated in that location, which may prevent smooth discharge of fuel. In some cases, a large amount of fuel may be returned from the far end of the fuel cavity 2310 to be concentrated toward the distal fuel vent 2330b. Hence, turbulence is generated around the distal fuel vent 2330b as a large amount of fuel is concentrated in that location, which may prevent smooth discharge of fuel. Moreover, the flow of fuel may be jumbled, i.e., randomly directed, in the fuel cavity to generate turbulence irrespective of the position of a fuel vent, which may prevent smooth discharge of fuel.

On the other hand, as illustrated in FIG. 6, in a fuel nozzle having the fuel flow guide 2500 according to the exemplary embodiment, the fuel introduced into the fuel cavity 2310 is relatively uniformly distributed and guided by the fuel flow guide 2500, with the consequence that it is possible to reduce the turbulence generated around the fuel vent or inside the fuel cavity. Thus, the fuel can be smoothly discharged through the plurality of fuel vents 2330.

Next, a fuel nozzle according to an alternative exemplary embodiment will be described with reference to FIGS. 7 and 8. Except for a portion of the structure of the fuel flow guide, i.e., the receiving end of the fuel flow guide 2500, the fuel nozzle of the alternative exemplary embodiment is the same as that of the above-described exemplary embodiment (FIG. 4), and unnecessarily repetitious description will therefore be omitted.

Figure 7:
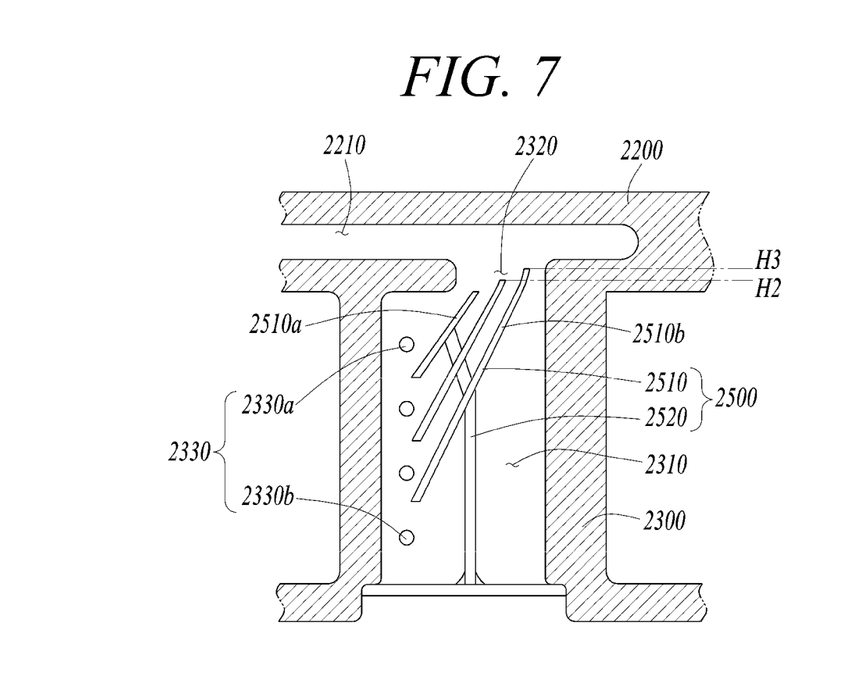
FIGS. 7 and 8 are sectional views of a portion of a fuel nozzle according to an alternative exemplary embodiment.
Figure 8:
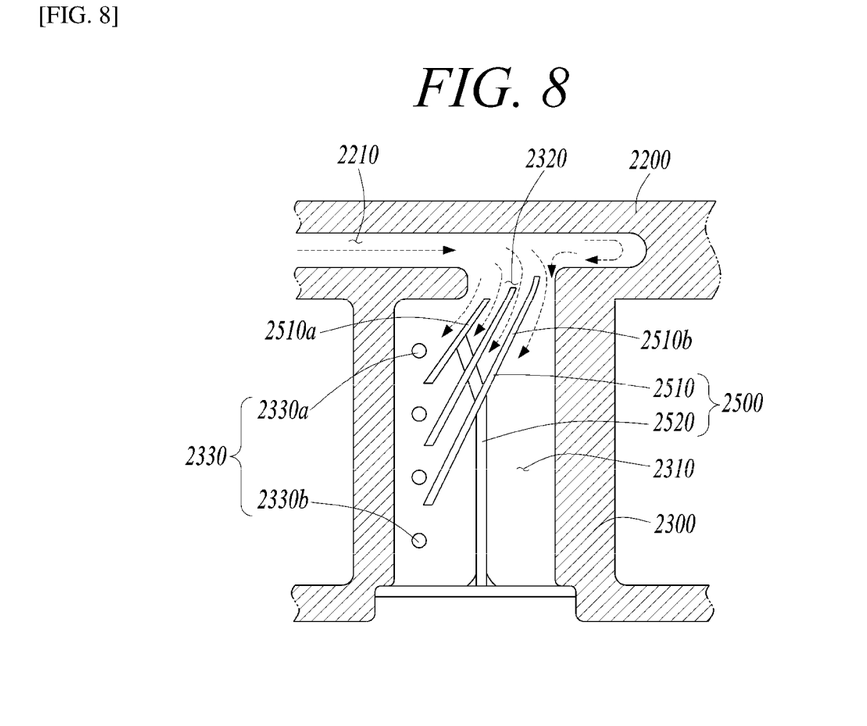

As illustrated in FIGS. 7 and 8, the fuel flowing in the second passage 2210 is introduced into the fuel cavity 2310 through the fuel aperture 2320. A fuel flow guide 2500 for distributing and guiding the introduced fuel is formed downstream of the fuel aperture 2320. The fuel flow guide 2500 may include a plurality of guide members 2510 and a guide support 2520. The configuration of the guide members 2510 differs from that of the above exemplary embodiment.

The fuel flow guide 2500 of the above exemplary embodiment (FIG. 4) includes a fuel receiving end of the plurality of guide members 2510, which are respectively disposed such that an upper end of each guide member 2510 is arranged along a line (H1) drawn across the downstream side of the fuel aperture 2320. That is, each of the guide members 2510 of the above exemplary embodiment is disposed at the same height H1. In contrast, the guide members 2510 of the alternative exemplary embodiment are formed at different heights H1 to H3 on the basis of the downstream side of the fuel aperture 2320.

In more detail, a guide member 2510b for guiding fuel to the distal fuel vent 2330b is disposed at a greater height than a guide member 2510a for guiding fuel to the proximal fuel vent 2330a. That is, the respective heights the guide members 2510 are determined according to the relationship H1<H2<H3.

By the formation of the guide members as described above, it is possible to decrease the flow amount of fuel guided by the first guide member 2510a and increase the flow amount of fuel guided by the second guide member 2510b. As a result, the alternative exemplary embodiment can obtain an effect similar to that according to the area ratio control in the exemplary embodiment described with respect to FIG. 4.

Of course, in either exemplary embodiment, the number of guide members 2510 may correspond to the number of fuel vents 2330, and the guide members 2510 may be inclined at the same angle or at different angles or at a gradually increasing/decreasing angle. Further with respect to either embodiment, a first inclination angle $\theta_1$ of a first guide member 2510a may be smaller than a second inclination angle $\theta_2$ of a second guide member 2510b in the event that the guide members 2510 are inclined at different angles, and the guide members 2510 may be formed to control the area ratio of the fuel apertures 2320.

Figure 9:
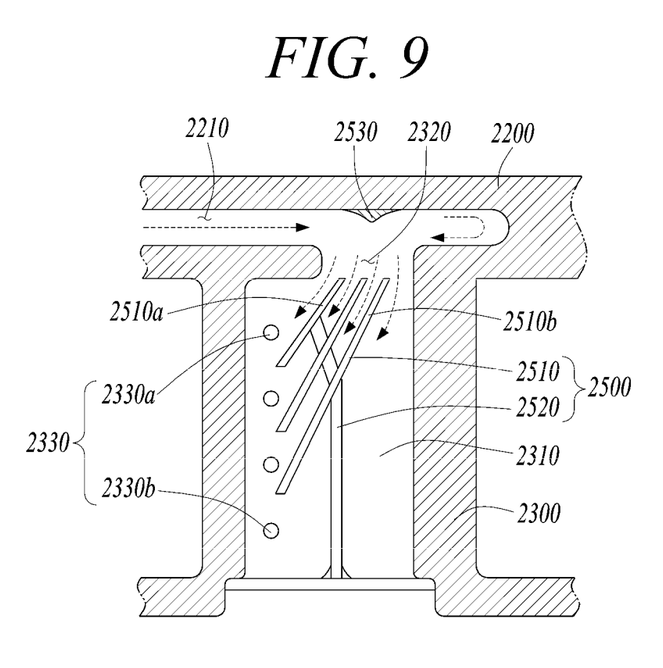
FIG. 9 is a sectional view of a portion of a fuel nozzle according to a modification applicable to the embodiment of FIG. 4.

FIG. 9 shows a modified example of the fuel nozzle according to either of the above exemplary embodiments, though the fuel flow guide configuration of FIG. 4 is shown. That is, the fuel flow guide 2500 of the modified exemplary embodiment of FIG. 9 may be in the form of the exemplary embodiment or the alternative exemplary embodiment.

Referring to FIG. 9, the fuel flow guide 2500 of the modified exemplary embodiment may selectively further include an auxiliary guide member 2530 formed in the second passage 2210. The auxiliary guide member 2530 may be a member protruding from one inner wall of the second passage 2210 by a predetermined height. The auxiliary guide member 2530 may be formed on one inner wall of the second passage 2210 at a position corresponding to the fuel aperture 2320 or at a position upstream of the fuel aperture 2320. The auxiliary guide member 2530 may have a fillet shaped side surface to direct the fuel flowing in the fuel passage 2210 into the fuel aperture 2320 or toward the opposite side of the fuel passage 2210 before entering the fuel aperture 2320. That is, the auxiliary guide member 2530 may guide the flow of fuel toward the fuel aperture 2320 before the fuel flowing in the second passage 2210 is introduced into the fuel aperture 2320, thereby reducing the flow amount of fuel passing through the fuel aperture 2320 without flowing thereinto.

As is apparent from the above description, it is possible to distribute and guide the fuel that flows from the fuel passage to the swirler vane.

While one or more exemplary embodiments have been described with reference to the accompanying drawings, it is to be understood by those skilled in the art that various modifications and changes in form and details can be made therein without departing from the spirit and scope as defined by the appended claims. Therefore, the description of the exemplary embodiments should be construed in a descriptive sense only and not to limit the scope of the claims, and many alternatives, modifications, and variations will be apparent to those skilled in the art.

What is claimed is:

1. A fuel nozzle comprising:
a main cylinder extending in one direction;
an auxiliary cylinder surrounding the main cylinder and defining a fuel passage between the auxiliary cylinder and the main cylinder;
a shroud spaced that is apart from the auxiliary cylinder and surrounds the auxiliary cylinder;
a swirler vane that is disposed between the auxiliary cylinder and the shroud and defines a fuel cavity having a plurality of fuel vents and communicating with the fuel passage so that fuel flowing in the fuel passage flows into the fuel cavity through a fuel aperture formed in the swirler vane; and
a fuel flow guide disposed inside the fuel cavity and configured to guide fuel that flows from the fuel passage and enters the fuel cavity and to distribute the guided fuel in the fuel cavity,
wherein the fuel flow guide includes a plurality of guide members of which the number corresponds to the number of the fuel vents, a number of portions of the fuel aperture formed by the plurality of guide members being the same as a number of the plurality of fuel vents formed inside the fuel cavity.

2. The fuel nozzle according to claim 1, wherein the fuel aperture formed in the swirler is configured to communicate with the fuel passage and the fuel cavity so that the fuel flowing in the fuel passage flows into the fuel cavity via the fuel aperture.

3. The fuel nozzle according to claim 2, wherein the fuel flow guide includes a fuel receiving end that extends toward the fuel passage and terminates at the fuel aperture.

4. The fuel nozzle according to claim 3, wherein the fuel receiving end of the fuel flow guide is disposed downstream of the fuel aperture and is arranged along a line perpendicular to a flow direction of fuel through the fuel aperture.

5. The fuel nozzle according to claim 3, wherein the fuel receiving end of the fuel flow guide includes a plurality of plates, and wherein at least one of the plurality of plates includes a curved end disposed toward the fuel passage.

6. The fuel nozzle according to claim 2, wherein
each of the plurality of guide members has a plate shape for receiving fuel entering the fuel cavity via the fuel aperture, for guiding the received fuel, and for distributing the fuel introduced into the fuel cavity.

7. The fuel nozzle according to claim 6, further comprising:
a guide support disposed inside the fuel cavity and having a first end fixed to an inner surface of the fuel cavity and having a second end supporting the plurality of guide members inside the fuel cavity.

8. The fuel nozzle according to claim 6, wherein each of the plurality of guide members is inclined at a same angle with respect to a line perpendicular to a flow direction of fuel through the fuel aperture.

9. The fuel nozzle according to claim 6, wherein each of the plurality of guide members is inclined at a different angle with respect to a line perpendicular to a flow direction of fuel through the fuel aperture.

10. The fuel nozzle according to claim 9, wherein the plurality of guide members are configured such that a first angle of inclination of a first guide member of the plurality of guide members for guiding fuel to a proximal fuel vent formed in the swirler vane is smaller than a second angle of inclination of a second guide member of the plurality of guide members for guiding fuel to a distal fuel vent formed in the swirler vane.

11. The fuel nozzle according to claim 6, wherein
each of the plurality of fuel vents communicates with the fuel cavity and are arranged along a line extending away from the fuel aperture.

12. The fuel nozzle according to claim 11, wherein the plurality of guide members are disposed at different heights with respect to a line perpendicular to a flow direction of fuel through the fuel aperture and are configured such that a height of a second guide member for guiding fuel to a distal fuel vent of the plurality of fuel vents is larger than a height of a first guide member for guiding fuel to a proximal fuel vent of the plurality of fuel vents.

13. The fuel nozzle according to claim 11, wherein the plurality of guide members divides the fuel aperture into a plurality of subdivisions, and wherein the plurality of subdivisions corresponds to the plurality of fuel vents.

14. The fuel nozzle according to claim 13, wherein the plurality of guide members are configured such that a second area of the divided fuel aperture formed by a second guide member for guiding fuel to a distal fuel vent of the plurality of fuel vents is different from a first area of the divided fuel aperture formed by a first guide member for guiding fuel to a proximal fuel vent of the plurality of fuel vents.

15. The fuel nozzle according to claim 13, wherein the plurality of guide members are configured such that a second area of the fuel aperture formed by a second guide member for guiding fuel to a distal fuel vent of the plurality of fuel vents is larger than a first area of the divided fuel aperture formed by a first guide member for guiding fuel to a proximal fuel vent of the plurality of fuel vents.

16. The fuel nozzle according to claim 2, wherein the fuel flow guide comprises an auxiliary guide member protruding from a first inner wall of the fuel passage toward a second inner wall of the fuel passage opposite the first inner wall.

17. The fuel nozzle according to claim 16, wherein the second inner wall communicates with the fuel aperture of the swirler vane, and wherein the auxiliary guide member is disposed so as to face the fuel aperture and includes a fillet shaped side surface to direct the fuel flowing in the fuel passage into the fuel aperture.

18. The fuel nozzle according to claim 16, wherein the second inner wall communicates with the fuel aperture of the swirler vane, and wherein the auxiliary guide member is disposed upstream of the fuel aperture and includes a fillet shaped side surface to direct the fuel flowing in the fuel passage toward the second inner wall before entering the fuel aperture.

19. A combustor comprising a combustion chamber assembly comprising a combustion chamber in which fuel is burned; and a fuel nozzle assembly comprising a plurality of fuel nozzles to inject fuel into the combustion chamber, each of the fuel nozzles comprising:
  a main cylinder extending in one direction;
  an auxiliary cylinder surrounding the main cylinder and defining a fuel passage between the auxiliary cylinder and the main cylinder;
  a shroud spaced that is apart from the auxiliary cylinder and surrounds the auxiliary cylinder;
  a swirler vane that is disposed between the auxiliary cylinder and the shroud and defines a fuel cavity having a plurality of fuel vents and communicating with the fuel passage so that fuel flowing in the fuel passage flows into the fuel cavity through a fuel aperture formed in the swirler vane; and
  a fuel flow guide disposed inside the fuel cavity and configured to guide fuel that flows from the fuel passage and enters the fuel cavity and to distribute the guided fuel in the fuel cavity,
  wherein the fuel flow guide includes a plurality of guide members of which the number corresponds to the number of the fuel vents, a number of portions of the fuel aperture formed by the plurality of guide members being the same as a number of the plurality of fuel vents formed inside the fuel cavity.

20. A gas turbine comprising a compressor to compress air; a combustor to produce combustion gas by mixing the compressed air with fuel for combustion; and a turbine to generate power by the combustion gas, the combustor comprising:
  a combustion chamber in which fuel is burned; and
  a fuel nozzle assembly comprising a plurality of fuel nozzles to inject fuel into the combustion chamber, each of the fuel nozzles comprising:
  a main cylinder extending in one direction;
  an auxiliary cylinder surrounding the main cylinder and defining a fuel passage between the auxiliary cylinder and the main cylinder;
  a shroud spaced that is apart from the auxiliary cylinder and surrounds the auxiliary cylinder;
  a swirler vane that is disposed between the auxiliary cylinder and the shroud and defines a fuel cavity having a plurality of fuel vents and communicating with the fuel passage so that fuel flowing in the fuel passage flows into the fuel cavity through a fuel aperture formed in the swirler vane; and
  a fuel flow guide disposed inside the fuel cavity and configured to guide fuel that flows from the fuel passage and enters the fuel cavity and to distribute the guided fuel in the fuel cavity,
  wherein the fuel flow guide includes a plurality of guide members of which the number corresponds to the number of the fuel vents, a number of portions of the fuel aperture formed by the plurality of guide members being the same as a number of the plurality of fuel vents formed inside the fuel cavity.

\* \* \* \* \*